Feb. 16, 1943.   W. S. MASON   2,311,558
PISTON RING
Filed July 20, 1942
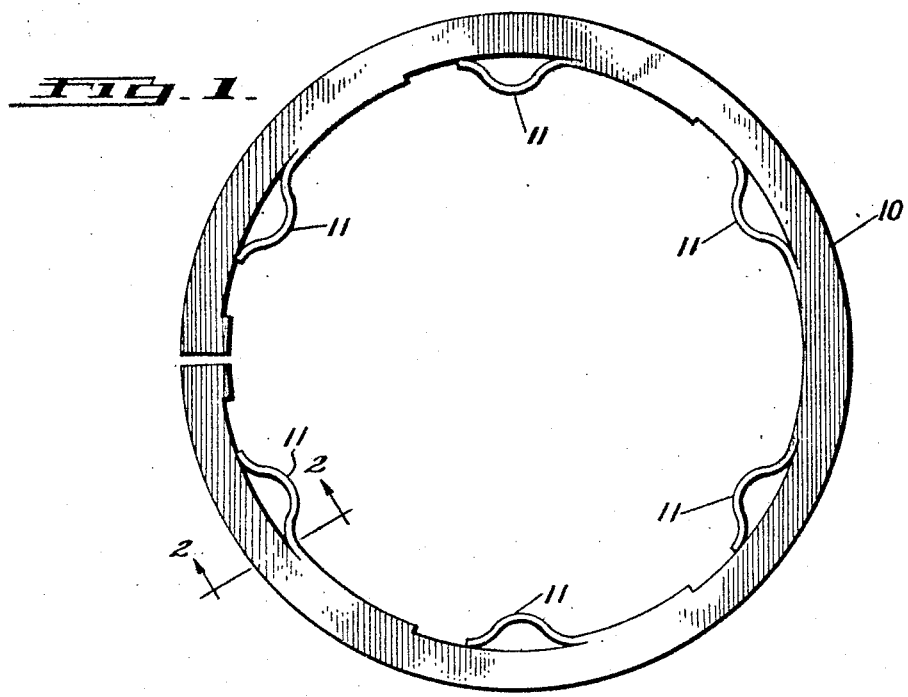
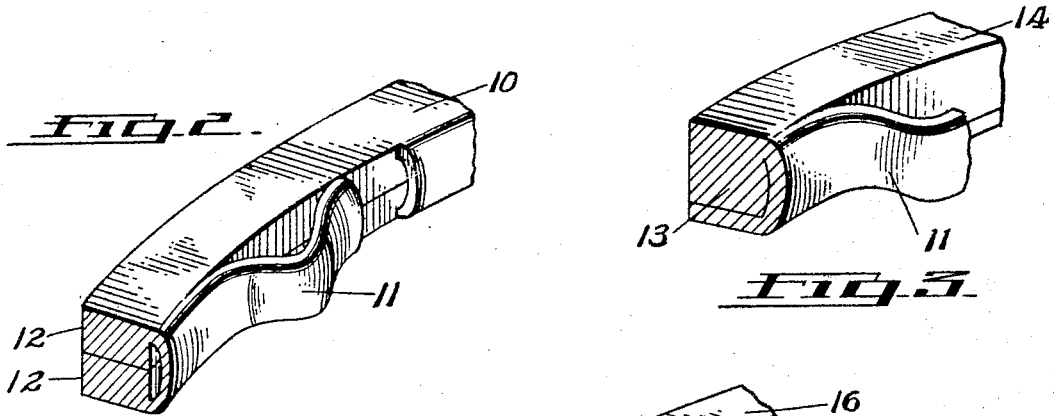
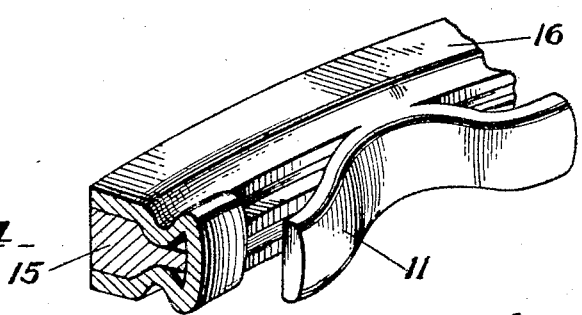
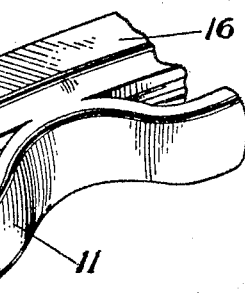
Inventor
William S. Mason
by Attorney Patented Feb. 16, 1943

2,311,558

UNITED STATES PATENT OFFICE 2,311,558

PISTON RING

William S. Mason, Norfolk, Va.

Application July 20, 1942, Serial No. 451,600

12 Claims. (Cl. 309—44)

This invention relates to piston rings, and is a continuation in part of my pending application, Ser. No. 422,193, filed December 9, 1941.

One object of my invention is to provide an improved piston ring of the type that has integral means for supplementing its inherent radial expansibility.

Another object is to provide a ring of the above mentioned type that can be used in the comparatively hot top grooves of a piston of a modern high speed high compression engine as well as those of low compression engines.

Another object is to provide a piston ring which will tend to maintain a film of oil between its periphery and the wall of the cylinder, so as to reduce cylinder and ring wear, and improve the sealing action of the ring.

Other objects are to provide a ring which is relatively cheap to manufacture, easy to install, efficient in operation, and which has a comparatively long useful life.

Referring to the drawing:

Figure 1 is a top view of a piston ring constructed according to the present invention;

Figure 2 is an enlarged fragmentary perspective view on the line 2—2 of Figure 1, looking in the direction of the arrow; and, Figures 3 and 4 are fragmentary perspective views of modifications.

The ring 10, shown in Figures 1 and 2, like those shown in Figures 3 and 4, comprise an elongated band of resilient metal doubled upon itself longitudinally forming the upper and lower sides of the ring and its edges forming the outer periphery and its medial portion forming the inner periphery and spacing said sides apart axially and being provided with elongated annularly extending radially expansible spring fingers. The spring fingers 11, supplement the inherent radial expansibility of the ring, and the flanges 12, provide additional bearing surface for the spring fingers and greatly reduce bending strain at their point of connection to the ring, also provide the ring with a good heat path to the wall of the cylinder. Another advantage of the flanges is, they prevent the sides of the ring from being chipped away from the side walls of the groove at high engine speeds and permitting leakage therebetween.

One side of ring 14, shown in Figure 3, is provided with flange 13, which is wide enough to prevent the sides of the ring from being thrown away from the side walls of the groove, provide a good heat path for the ring, and bearing surfaces for the spring fingers.

In the packing shown in Figure 4, an additional ring 15, is interposed between the sides of ring 16, to provide an additional heat path and wearing surface, and as ring 16, provides the necessary radial pressure, it can be made of aluminum or alloy, which is relatively light in weight, and provides a good wearing surface, and has good heat conductivity, and which would be relatively cheap to manufacture, and replace when worn out.

One advantage of the rings is the crevice between the flanges forms an oil receiving channel which holds a film of oil which lubricates the wall of the cylinder and the periphery of the ring, reducing wear on both and improving the sealing action of the ring. Another advantage is the axial height of the piston rings can be adjusted slightly so they can be used in a worn groove by merely interposing a shim or an additional ring between the flange or flanges.

I claim:

1. For use in a cylinder in combination with a reciprocating piston provided with a piston ring groove, a piston ring comprising an elongated band of resilient metal doubled upon itself longitudinally forming the upper and lower sides of the ring and its edges forming the outer periphery and its medial portion forming the inner periphery and spacing said sides apart axially, said inner periphery being provided with radially expansible spring fingers adapted to seat on the bottom of the groove in said piston and urge the periphery of the ring against the wall of said cylinder, and one at least of said sides being provided with a flange formed and arranged to maintain the axially spaced arrangement of the sides outwardly of the inner periphery of the ring and provide bearing surface for said spring fingers.

2. The structure of claim 1, in which said flange comprises a boss.

3. The structure of claim 1, in which an annular member is interposed between said sides to adjust the axial height of the piston ring to that of the groove in said piston.

4. For use in a cylinder in combination with a reciprocating piston provided with a packing ring groove, a piston ring comprising an elongated band of resilient metal doubled upon itself longitudinally forming the upper and lower sides of the ring and its edges forming the outer periphery and its medial portion forming the inner periphery and spacing said sides apart axially and being provided with radially expansible spring fingers, one at least of said sides being thicker than said inner periphery of the ring and being formed and arranged to provide bearing surface for said spring fingers and to maintain the axially spaced arrangement of the sides outwardly of the inner periphery of the ring.

5. The structure of claim 4, in which both of said sides are thicker than said inner periphery of the ring and are arranged complementary.

6. For use in a cylinder in combination with a reciprocating piston provided with a piston ring groove, a piston ring comprising an elongated band of resilient metal doubled upon itself longitudinally forming the upper and lower sides of the ring and its edges forming the outer periphery and its medial portion forming the inner periphery and spacing said sides apart axially, said inner periphery being provided with radially expansible spring fingers and each of said sides being provided with a flange adapted to maintain the axially spaced arrangement of the sides outwardly of the inner periphery of the ring and provide bearing surface for said spring fingers.

7. The structure of claim 6, in which said flanges comprise a boss.

8. The structure of claim 6, in which said flanges are thicker than the inner periphery of said ring.

9. The structure of claim 6, in which an annular member is interposed between said flanges to adjust the axial height of the piston ring to that of the piston ring groove, and provide an additional heat path between the piston ring and the wall of said cylinder.

10. For use in a cylinder in combination with a reciprocating piston provided with a piston ring groove, a piston ring comprising an elongated band of resilient metal doubled upon itself longitudinally forming the upper and lower sides of the ring and its edges forming the outer periphery and its medial portion forming the inner periphery and spacing said sides apart axially, said inner periphery being provided with radially expansible spring fingers adapted to seat on the bottom of the groove in said piston and urge the outer periphery of the ring against the wall of said cylinder, one at least of said sides being provided with a flange adapted to provide bearing surface for said spring fingers.

11. The structure of claim 10, in which said flange comprises a boss.

12. For use in a cylinder in combination with a reciprocating piston provided with a piston ring groove, a piston ring comprising an elongated band of resilient metal doubled upon itself longitudinally forming the upper and lower sides of the ring and its edges forming the outer periphery and its medial portion forming the inner periphery and spacing said sides apart axially, said inner periphery being provided with radially expansible spring fingers adapted to seat on the bottom of the groove in the piston and urge the outer periphery of the ring against the wall of said cylinder, one at least of said sides being provided with means formed and arranged to provide bearing surface for said spring fingers and to maintain the axially spaced arrangement of the sides outwardly of the inner periphery of said ring.

WILLIAM S. MASON.